US011938897B2

(12) United States Patent
Ogawa et al.

(10) Patent No.: US 11,938,897 B2
(45) Date of Patent: Mar. 26, 2024

(54) ON-VEHICLE DEVICE, MANAGEMENT METHOD, AND MANAGEMENT PROGRAM

(71) Applicants: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

(72) Inventors: Akihiro Ogawa, Osaka (JP); Hirofumi Urayama, Osaka (JP); Takeshi Hagihara, Yokkaichi (JP); Yasuhiro Yabuuchi, Yokkaichi (JP)

(73) Assignees: SUMITOMO ELECTRIC INDUSTRIES, LTD., Osaka (JP); AUTONETWORKS TECHNOLOGIES, LTD., Mie (JP); SUMITOMO WIRING SYSTEMS, LTD., Mie (JP)

( * ) Notice: Subject to any disclaimer, the term of this patent is extended or adjusted under 35 U.S.C. 154(b) by 312 days.

(21) Appl. No.: 16/630,514

(22) PCT Filed: Jun. 12, 2018

(86) PCT No.: PCT/JP2018/022350
§ 371 (c)(1),
(2) Date: Jan. 13, 2020

(87) PCT Pub. No.: WO2019/012888
PCT Pub. Date: Jan. 17, 2019

(65) Prior Publication Data
US 2020/0361412 A1    Nov. 19, 2020

(30) Foreign Application Priority Data

Jul. 12, 2017 (JP) .................................. 2017-135844

(51) Int. Cl.
*G06F 21/00* (2013.01)
*B60R 25/24* (2013.01)
(Continued)

(52) U.S. Cl.
CPC .............. *B60R 25/24* (2013.01); *B60R 25/34* (2013.01); *G06F 21/44* (2013.01); *G06F 21/62* (2013.01); *H04L 67/12* (2013.01)

(58) Field of Classification Search
CPC ......... G06F 21/44; G06F 21/62; H04L 67/12; B60R 25/24
See application file for complete search history.

(56) References Cited

U.S. PATENT DOCUMENTS

2006/0112213 A1\* 5/2006 Suzuoki .................. G06F 21/74
711/100
2008/0059806 A1 3/2008 Kishida et al.
(Continued)

FOREIGN PATENT DOCUMENTS

EP    3219553 A1    9/2017
JP    2002-202895 A    7/2002
(Continued)

OTHER PUBLICATIONS

"It Words Dictionary E-Words", [online], [searched in May 1, 2017], URL <http://e-words.jp/w/ tamperresistance.html>.

*Primary Examiner* — Rodman Alexander Mahmoudi
(74) *Attorney, Agent, or Firm* — Oliff PLC (57) ABSTRACT

An on-vehicle device is mounted on a vehicle, and includes: a processing unit; a determination unit configured to determine whether or not the vehicle is in a predetermined stop state; and a secure area that is accessible from the processing unit when the processing unit has output predetermined information. The secure area has, stored therein, control information that allows an external device to control the
(Continued)

on-vehicle device. When the determination unit has made a positive determination, the processing unit accesses the secure area and performs an acquisition process of acquiring the control information from the secure area.

8 Claims, 5 Drawing Sheets

(51) Int. Cl.
*B60R 25/34* (2013.01)
*G06F 21/44* (2013.01)
*G06F 21/62* (2013.01)
*H04L 29/06* (2006.01)
*H04L 67/12* (2022.01)

(56) References Cited

U.S. PATENT DOCUMENTS

| | | | |
|---|---|---|---|
| 2009/0025079 A1* | 1/2009 | Tanizawa | H04L 63/08 |
| | | | 726/14 |
| 2011/0215949 A1* | 9/2011 | Yarnold | G08G 1/123 |
| | | | 340/989 |
| 2014/0032865 A1* | 1/2014 | Nagai | G06F 21/79 |
| | | | 711/E12.091 |
| 2015/0251538 A1* | 9/2015 | Tamura | G01C 21/3626 |
| | | | 340/461 |
| 2016/0019787 A1* | 1/2016 | Tucker | G01S 5/017 |
| | | | 340/989 |
| 2016/0371481 A1 | 12/2016 | Miyake | |
| 2017/0327084 A1* | 11/2017 | Park | B60R 16/037 |
| 2018/0045535 A1* | 2/2018 | Kim | G08G 1/205 |
| 2018/0058967 A1* | 3/2018 | Jang | G01C 5/06 |
| 2018/0281748 A1* | 10/2018 | Murase | G06F 21/44 |

FOREIGN PATENT DOCUMENTS

| | | |
|---|---|---|
| JP | 2008-59450 A | 3/2008 |
| JP | 2014-526999 A | 10/2014 |
| JP | 2016-072675 A | 5/2016 |
| JP | 2017-33248 A | 2/2017 |
| JP | 6140874 B1 | 5/2017 |
| WO | 2013/037996 A1 | 3/2013 |
| WO | 2013/51122 A1 | 4/2013 |
| WO | 2015/129352 A1 | 9/2015 |
| WO | 2016/075865 A1 | 5/2016 |

\* cited by examiner

ON-VEHICLE DEVICE, MANAGEMENT METHOD, AND MANAGEMENT PROGRAM

TECHNICAL FIELD

The present invention relates to an on-vehicle device, a management method, and a management program.

This application claims priority on Japanese Patent Application No. 2017-135844 filed on Jul. 12, 2017, the entire contents of which are incorporated herein by reference.

BACKGROUND ART

Patent Literature 1 (International Publication WO2013/51122) discloses an on-vehicle network system as follows. That is, the on-vehicle network system includes a relay device that relays data between devices inside a vehicle and devices outside the vehicle. The on-vehicle network system includes relay control means that inhibits the relay device from relaying data while the vehicle is traveling.

CITATION LIST

Patent Literature

PATENT LITERATURE 1: International Publication WO2013/51122

Non Patent Literature

NON PATENT LITERATURE 1: "IT words dictionary e-Words", [online], [searched in May 1, 2017], Internet URL <http://e-words.jp/w/tamper resistance.html>

SUMMARY OF INVENTION (1) An on-vehicle device according to the present disclosure is an on-vehicle device which is mounted on a vehicle, and includes a processing unit, a determination unit configured to determine whether or not the vehicle is in a predetermined stop state, and a secure area that is accessible from the processing unit when the processing unit has output predetermined information. The secure area has, stored therein, control information that allows an external device to control the on-vehicle device. When the determination unit has made a positive determination, the processing unit accesses the secure area and performs an acquisition process of acquiring the control information from the secure area.

(8) A management method according to the present disclosure is a management method to be performed in an on-vehicle device that is mounted on a vehicle, and that includes a processing unit, and a secure area accessible from the processing unit when the processing unit has output predetermined information. The secure area has, stored therein, control information that allows an external device to control the on-vehicle device. The method includes: determining whether or not the vehicle is in a predetermined stop state; and when a result of the determination is positive, causing the processing unit to access the secure area and perform an acquisition process of acquiring the control information from the secure area.

(9) A management program according to the present disclosure is a management program to be used in an on-vehicle device mounted on a vehicle. The program causes a computer to function as a processing unit, and a determination unit configured to determine whether or not the vehicle is in a predetermined stop state. The on-vehicle device includes a secure area that is accessible from the processing unit when the processing unit has output predetermined information. The secure area has, stored therein, control information that allows an external device to control the on-vehicle device. When the determination unit has made a positive determination, the processing unit accesses the secure area and performs an acquisition process of acquiring the control information from the secure area.

One aspect of the present disclosure can be implemented not only as an on-vehicle device including such a characteristic processing unit but also as an on-vehicle communication system including the on-vehicle device. In addition, one aspect of the present disclosure can be implemented as a semiconductor integrated circuit that realizes a part or the entirety of the on-vehicle device.

DESCRIPTION OF EMBODIMENTS

Conventionally, an on-vehicle network system for improving security in an on-vehicle network has been developed.

Problems to be Solved by the Present Disclosure

In the on-vehicle network system disclosed in Patent Literature 1, when the vehicle is traveling, communication with devices outside the vehicle is cut off to avoid unauthorized access of the devices from outside the vehicle. However, in many cases, the relay device is more vulnerable in terms of security in its management function as compared to its relaying function. Specifically, for example, if the types of packets that are permitted to be relayed are illegally rewritten, unauthorized packets are also relayed and transmitted to the devices inside the vehicle, which makes the devices inside the vehicle vulnerable to attacks from the outside of the vehicle.

The present disclosure has been made to solve the above problem, and an object of the present disclosure is to provide an on-vehicle device, a management method, and a management program capable of providing satisfactory communication in an on-vehicle network.

Effect of the Present Disclosure

According to the present disclosure, satisfactory communication can be provided in an on-vehicle network.

Description of Embodiments

First, contents of an embodiment of the present disclosure are listed and described.

(1) An on-vehicle device according to an embodiment of the present disclosure is an on-vehicle device which is mounted on a vehicle, and includes a processing unit, a determination unit configured to determine whether or not the vehicle is in a predetermined stop state, and a secure area that is accessible from the processing unit when the processing unit has output predetermined information. The secure area has, stored therein, control information that allows an external device to control the on-vehicle device. When the determination unit has made a positive determination, the processing unit accesses the secure area and performs an acquisition process of acquiring the control information from the secure area.

As described above, when the vehicle is in the predetermined stop state, the control information is acquired from the secure area which is difficult to be illegally accessed, whereby the use of the control information can be reliably restricted during traveling of the vehicle in which the control information should not be used. Therefore, for example, it is possible to reduce the risk that the control information is abused during traveling of the vehicle and the types of packets that are permitted to be relayed are illegally rewritten. Thus, it is possible to avoid the situation that the on-vehicle device is taken over and remotely controlled while the vehicle is traveling. This provides satisfactory communication in the on-vehicle network.

(2) Preferably, the on-vehicle device further includes an authentication unit configured to perform an authentication process on the external device, and the processing unit performs the acquisition process when the determination unit has made a positive determination and the authentication process has succeeded.

For example, when the external device is an unauthorized device, the authentication process for the external device is highly likely to fail. The above-described configuration can further reduce the risk of abuse of the control information by an unauthorized external device.

(3) Preferably, the determination unit is included in the secure area.

In the above configuration, since the determination unit is included in the secure area which cannot be easily accessed, the determination unit can be protected from hacking. Therefore, for example, it is possible to prevent the determination unit from being illegally operated and being caused to perform a positive determination for the purpose of illegally acquiring the control information.

(4) More preferably, a first determination unit is provided inside the secure area, and a second determination unit is provided outside the secure area, and the processing unit accesses the secure area and performs the acquisition process when both the first determination unit and the second determination unit have made positive determinations.

In the above configuration, for example, even when either one of the first determination unit and the second determination unit is illegally operated and forced to make a positive determination, the other determination unit that has not been subjected to the illegal operation can make a correct determination. Thus, illegal acquisition of the control information can be avoided with higher reliability.

(5) Preferably, the predetermined stop state is a parked state.

Since the predetermined stop state is the parked state, even when, for example, the control information has been abused and the on-vehicle device has been taken over and remotely controlled, runaway of the vehicle can be avoided because the vehicle is in the parked state.

(6) Preferably, the processing unit discards the control information when the vehicle has started to move or when use of the control information has ended.

In the above configuration, since the control information is discarded when the control information should not be used or when the control information is not used, the risk of abuse of the control information can be reduced.

(7) Preferably, when the determination unit has made a negative determination, the processing unit performs a response to reject an activation request, from the external device, which requests activation of a function to be implemented by the control information.

In the above configuration, the external device that has requested the use of the control information can be notified that the use of the control information is restricted in the vehicle.

(8) A management method according to an embodiment of the present disclosure is a management method to be performed in an on-vehicle device that is mounted on a vehicle, and that includes a processing unit, and a secure area accessible from the processing unit when the processing unit has output predetermined information. The secure area has, stored therein, control information that allows an external device to control the on-vehicle device. The method includes: determining whether or not the vehicle is in a predetermined stop state; and when a result of the determination is positive, causing the processing unit to access the secure area and perform an acquisition process of acquiring the control information from the secure area.

As described above, when the vehicle is in the predetermined stop state, the control information is acquired from the secure area which is difficult to be illegally accessed, whereby the use of the control information can be reliably restricted during traveling of the vehicle in which the control information should not be used. Therefore, for example, it is possible to reduce the risk that the control information is abused during traveling of the vehicle and the types of packets that are permitted to be relayed are illegally rewritten. Thus, it is possible to avoid the situation that the on-vehicle device is taken over and remotely controlled while the vehicle is traveling. This provides satisfactory communication in the on-vehicle network.

(9) A management program according to an embodiment of the present disclosure is a management program to be used in an on-vehicle device mounted on a vehicle. The program causes a computer to function as a processing unit, and a determination unit configured to determine whether or not the vehicle is in a predetermined stop state. The on-vehicle device includes a secure area that is accessible from the processing unit when the processing unit has output predetermined information. The secure area has, stored therein, control information that allows an external device to control the on-vehicle device. When the determination unit has made a positive determination, the processing unit accesses the secure area and performs an acquisition process of acquiring the control information from the secure area.

As described above, when the vehicle is in the predetermined stop state, the control information is acquired from the secure area which is difficult to be illegally accessed, whereby the use of the control information can be reliably restricted during traveling of the vehicle in which the control information should not be used. Therefore, for example, it is possible to reduce the risk that the control information is abused during traveling of the vehicle and the types of packets that are permitted to be relayed are illegally rewritten. Thus, it is possible to avoid the situation that the on-vehicle device is taken over and remotely controlled while the vehicle is traveling. This provides satisfactory communication in the on-vehicle network.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

[Configuration and Basic Operation]

Figure 1:
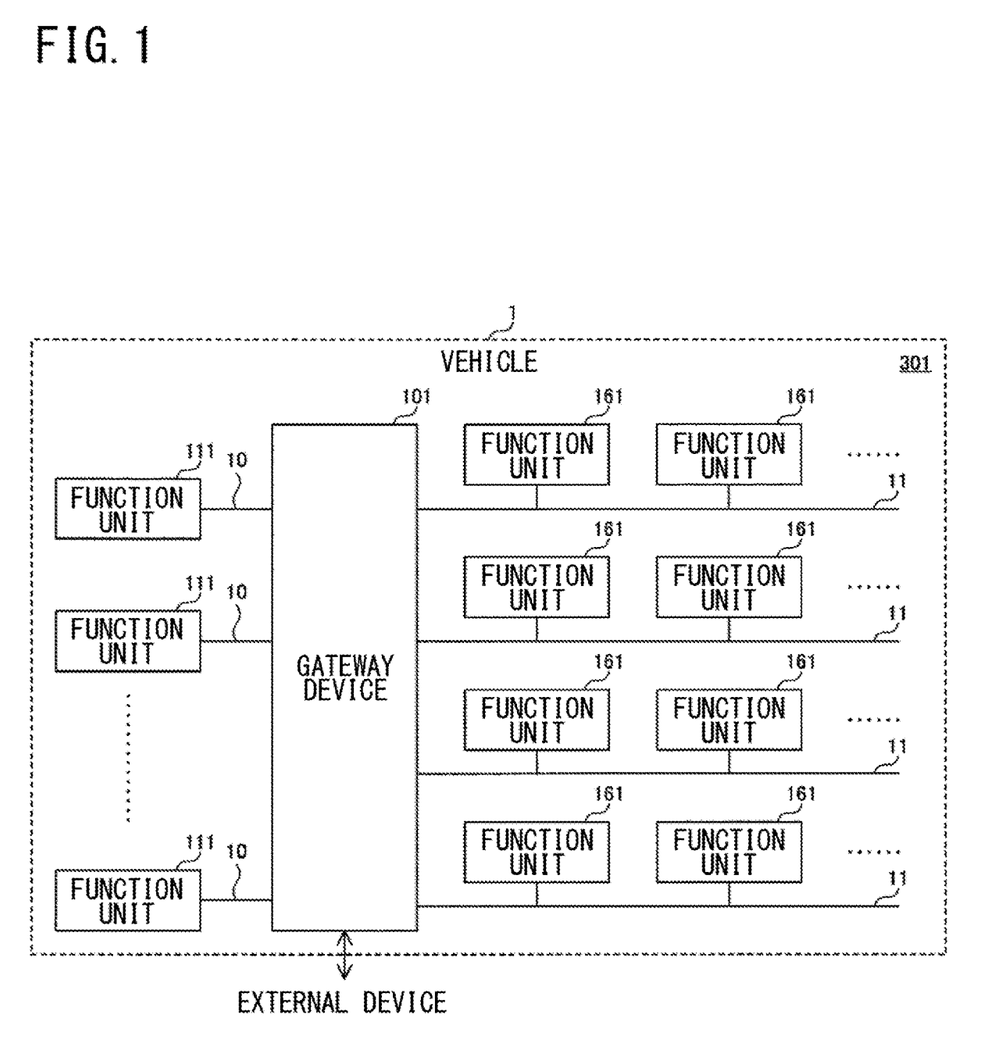
FIG. 1 shows a configuration of an on-vehicle communication system according to an embodiment of the present disclosure.

FIG. 1 shows the configuration of an on-vehicle communication system according to an embodiment of the present disclosure.

With reference to FIG. 1, an on-vehicle communication system 301 includes a gateway device (on-vehicle device) 101, a plurality of function units 111, and a plurality of function units 161. The on-vehicle communication system 301 is mounted on a vehicle 1.

Examples of the function units 111 include an autonomous ECU (Electronic Control Unit), a sensor, a navigation device, a TCU (Telematics Communication Unit), a central gateway (CGW), a human machine interface, a camera, etc.

The gateway device 101 and the function units 111 are connected to each other via cables (hereinafter also referred to as "Ethernet cables") 10 for on-vehicle Ethernet (registered trademark) communication, for example.

The gateway device 101 and the function units 111 communicate with each other by using the Ethernet cables 10. Between the gateway device 101 and the function units 111, information is exchanged by means of Ethernet frames based on IEEE802.3.

Examples of the function units 161 include: controllers for an engine, an AT (Automatic Transmission), a brake, an air-conditioner, etc.; and various sensors.

The gateway device 101 is connected to the function units 161 via buses (hereinafter also referred to as "CAN buses") 11 based on the standard of CAN, for example.

The CAN buses 11 are provided by category, for example. Specific examples of the CAN buses 11 include a drive-related bus, a chassis/safety-related bus, a body/electrical equipment-related bus, an AV/information-related bus, etc.

The gateway device 101 and the function units 161 communicate with each other by using the CAN buses 11. Between the gateway device 101 and the function units 161, information is exchanged by means of messages based on the communication standard of CAN, for example.

The gateway device 101 performs a relay process of relaying data in the on-vehicle network.

More specifically, the gateway device 101 performs, for example, a data relaying process between the function units 161 connected to the different CAN buses 11, a data relaying process between the respective function units 111, and a data relaying process between the function units 111 and the function units 161.

Although the gateway device 101 is configured to be connected to the function units 111 and 161 via the Ethernet cables 10 and the CAN buses 11, the gateway device 101 may be configured to be connected to the function units 111 and 161 via buses based on the standards such as FlexRay (registered trademark), MOST (Media Oriented Systems Transport) (registered trademark), LIN (Local Interconnect Network), etc.

Figure 2:
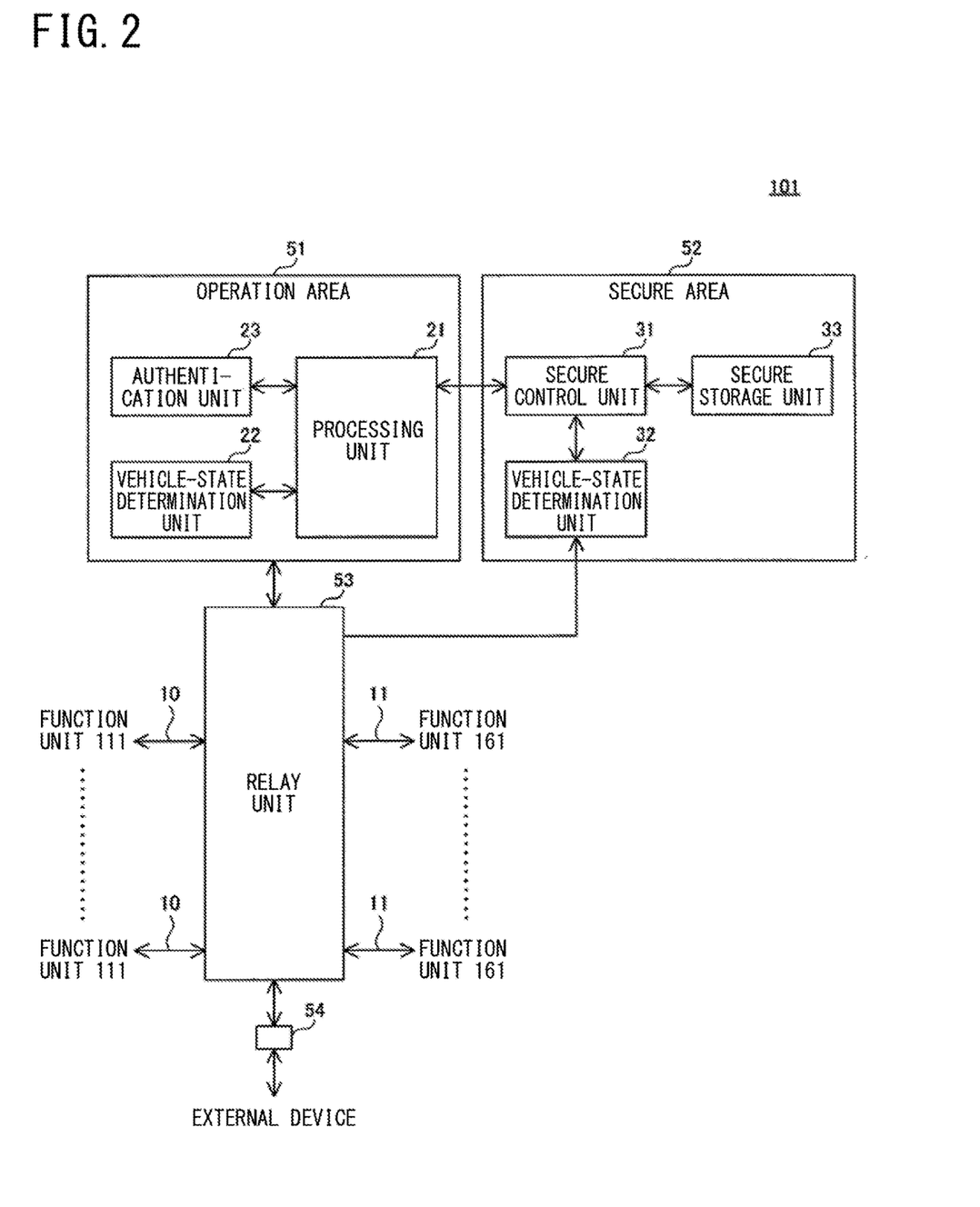
FIG. 2 shows a configuration of a gateway device in the on-vehicle communication system according to the embodiment of the present disclosure.

FIG. 2 shows the configuration of the gateway device in the on-vehicle communication system according to the embodiment of the present disclosure.

With reference to FIG. 2, the gateway device 101 includes an operation area 51, a secure area 52, a relay unit 53, and an external device port 54. The operation area 51 includes a processing unit 21, a vehicle-state determination unit 22, and an authentication unit 23. The secure area 52 includes a secure control unit 31, a vehicle-state determination unit 32, and a secure storage unit 33.

A management tool, which is an example of an external device, is connectable to the external device port 54. The management tool performs, for example, update and inspection for firmware in the gateway device 101 and the function units 111 and 161.

The relay unit 53 performs a relay process of relaying data in the on-vehicle network. For example, when the management tool is connected to the gateway device 101 via the external device port 54, the relay unit 53 communicates with the management tool.

Upon receiving information directed to the relay unit 53 from the management tool, the relay unit 53 outputs the received information to the operation area 51. Upon receiving information directed to the management tool from the operation area 51, the relay unit 53 transmits the received information to the management tool. In addition, the relay unit 53 relays data between the management tool and the function units 111 and 161.

The secure area 52 is a secure IC (Integrated Circuit), for example. The secure storage unit 33 in the secure area 52 stores therein a management program which is an example of control information. The management program is a program for causing the processing unit 21 to implement a management function, for example.

Examples of the management function include: a function of providing the management tool with a console for a command operation; a function for performing communication between the gateway device 101 and the management tool; and a function of performing filter setting, etc., in the relay unit 53. The filter setting determines the types of messages and Ethernet frames that are permitted to be relayed.

The secure storage unit 33 has tamper resistance described in, for example, Non-Patent Literature 1 ("IT words dictionary e-Words", [online], [searched in May 1, 2017], Internet URL <http://e-words.jp/w/tamper resistance.html<).

Tamper resistance represents the degree of difficulty of analysis for internal structures, data, etc., included in software and hardware. In other words, tamper resistance is an ability of preventing confidential data from being read by unauthorized means. In this example, the management program stored in the secure storage unit 33 has been encoded by the secure control unit 31 according to a predetermined encoding method.

For example, a situation in which the management tool is connected to the gateway device 101 via the external device port 54, is assumed.

The management tool transmits, for example, an activation request indicating a request for activation of the management program to the gateway device 101.

Upon receiving the activation request from the management tool via the external device port 54, the relay unit 53 in the gateway device 101 outputs the received activation request to the operation area 51.

The operation area 51 is an MPU (Micro Processing Unit), for example.

Upon receiving the activation request from the relay unit 53, the processing unit 21 in the operation area 51 outputs, to the vehicle-state determination unit 22, a determination command that causes the determination unit 22 to determine the state of the vehicle 1.

The vehicle-state determination unit 22 determines whether or not the vehicle 1 is in a predetermined stop state. The stop state is, for example, a state in which the speed of the vehicle 1 is lower than a predetermined threshold. The predetermined threshold is 1 km/h, for example. There are various stop states, and an example of the stop state is a parked state.

In the present embodiment, the case where the predetermined stop state is the parked state will be described hereinafter. That is, in the present embodiment, the vehicle-state determination unit 22 determines whether or not the vehicle 1 is in the parked state, for example.

More specifically, in the vehicle-state determination unit 22, messages to be monitored (hereinafter also referred to as "determination messages") have been registered by a user, for example.

Specific examples of the determination messages include: a message including information that indicates a shift range of an automatic transmission; a message including information that indicates the state of a parking brake; a message including information that indicates the state of a foot brake; and a message including vehicle speed information.

The vehicle-state determination unit 22 monitors messages that are relayed by the relay unit 53. When the relay unit 53 relays a determination message, the vehicle-state determination unit 22 acquires the determination message from the relay unit 53, and determines the state of the vehicle 1 on the basis of the acquired determination message.

Specifically, for example, when at least one of predetermined conditions C1 to C4 as follows is satisfied, the vehicle-state determination unit 22 determines that the vehicle 1 is in the predetermined stop state, that is, the parked state.

The predetermined condition C1 is, for example, that the shift range is in the parking position.

The predetermined condition C2 is, for example, that the shift range is in the neutral position and the parking brake is actuated.

The predetermined condition C3 is, for example, that the shift range is in the neutral position and the foot brake is actuated.

The predetermined condition C4 is, for example, that the shift range is in the neutral position and the vehicle speed is zero.

When none of the predetermined conditions C1 to C4 are satisfied, the vehicle-state determination unit 22 determines that the vehicle 1 is not in the predetermined stop state.

Upon receiving the determination command from the processing unit 21, the vehicle-state determination unit 22 creates determination result information indicating the determination result, and outputs the created determination result information to the processing unit 21.

For example, when the vehicle-state determination unit 22 has made a negative determination, the processing unit 21 performs a response to reject the activation request, from the management tool, which requests activation of a function to be implemented by the management program.

On the other hand, for example, when the vehicle-state determination unit 22 has made a positive determination and authentication has succeeded, the processing unit 21 accesses the secure area 52, and performs an acquisition process of acquiring, from the secure area 52, the management program that allows the management tool to control the gateway device 101.

More specifically, upon receiving the determination result information from the vehicle-state determination unit 22 as a response to the determination command, the processing unit 21 performs the following process.

That is, when the determination result information indicates that the vehicle 1 is not in the predetermined stop state, the processing unit 21 transmits rejection information indicating that the activation request has been rejected, to the management tool via the relay unit 53 and the external device port 54.

Meanwhile, when the determination result information indicates that the vehicle 1 is in the predetermined stop state, the processing unit 21 outputs an authentication command for authentication of the management tool to the authentication unit 23.

The authentication unit 23 performs an authentication process for an external device, for example. More specifically, upon receiving the authentication command from the processing unit 21, the authentication unit 23 exchanges an IP packet for authentication with the management tool via the relay unit 53 and the external device port 54, thereby attempting authentication for the management tool.

When the authentication of the management tool has succeeded, the authentication unit 23 outputs authentication success information to the processing unit 21. Meanwhile, when the authentication of the management tool has failed, the authentication unit 23 outputs authentication failure information to the processing unit 21.

As an example of tamper resistance, the secure area 52 is accessible from the processing unit 21 when the processing unit 21 outputs predetermined information.

More specifically, the processing unit 21 is permitted to access the secure storage unit 33 in the secure area 52 when the processing unit 21 outputs predetermined information, for example.

In this example, the secure storage unit 33 is accessible from the processing unit 21 when the processing unit 21 follows a predetermined procedure P1, and is not accessible when the processing unit 21 does not follow the procedure P1.

More specifically, the secure control unit 31 can access the secure storage unit 33. Meanwhile, the processing unit 21 can access the secure storage unit 33 only when it is authenticated by the secure control unit 31 in the secure area 52.

Upon receiving the authentication success information from the authentication unit 23 as a response to the authentication command, the processing unit 21 outputs, to the secure area 52, an access request for access to the secure storage unit 33, for example.

Upon receiving the access request from the processing unit 21, the secure control unit 31 in the secure area 52 outputs, to the vehicle-state determination unit 32, a determination command for causing the determination unit 32 to determine the state of the vehicle 1.

The vehicle-state determination unit 32 determines whether or not the vehicle 1 is in the predetermined stop state. More specifically, like the vehicle-state determination unit 22, determination messages have been registered in the vehicle-state determination unit 32 by the user, for example.

The vehicle-state determination unit 32 monitors the messages that are relayed by the relay unit 53. When the relay unit 53 relays a determination message, the determination unit 32 acquires the determination message from the relay unit 53, and determines the state of the vehicle 1 on the basis of the acquired determination message.

Specifically, for example, when at least one of the predetermined conditions C1 to C4 is satisfied, the vehicle-state determination unit 32 determines that the vehicle 1 is in the predetermined stop state.

When none of the predetermined conditions C1 to C4 are satisfied, the vehicle-state determination unit 32 determines that the vehicle 1 is not in the predetermined stop state.

Upon receiving the determination command from the secure control unit 31, the vehicle-state determination unit 32 creates determination result information indicating the determination result, and outputs the created determination result information to the secure control unit 31.

Upon receiving the determination result information from the vehicle-state determination unit 32 as a response to the determination command, the secure control unit 31 performs the following process.

That is, when the determination result information indicates that the vehicle 1 is not in the predetermined stop state, the secure control unit 31 outputs, to the processing unit 21, non-permission information indicating that access is not permitted.

Upon receiving the non-permission information from the secure control unit 31 as a response to the access request, the processing unit 21 recognizes that access to the secure area 52 has failed, and transmits rejection information to the management tool via the relay unit 53 and the external device port 54.

Meanwhile, when the determination result information indicates that the vehicle 1 is in the predetermined stop state, the secure control unit 31 outputs, to the processing unit 21, an authentication information request indicating a request for authentication information.

Upon receiving the authentication information request from the secure control unit 31, the processing unit 21 outputs authentication information including, for example, an exclusive key, a password, or a combination of a password and an ID, to the secure control unit 31 according to the received authentication information request.

Upon receiving the authentication information from the processing unit 21, the secure control unit 31 authenticates the received authentication information. When the authentication of the authentication information has failed, the secure control unit 31 outputs non-permission information to the processing unit 21. Meanwhile, when the authentication of the authentication information has succeeded, the secure control unit 31 outputs, to the processing unit 21, permission information indicating that access is permitted.

When the processing unit 21 has received the permission information from the secure control unit 31, the processing unit 21 is allowed to access the secure storage unit 33 via the secure control unit 31. However, when the processing unit 21 has received the non-permission information from the secure control unit 31, access to the secure storage unit 33 is blocked by the secure control unit 31.

The authentication of the processing unit 21 by the secure control unit 31 is not limited to the above-described procedure P1, and may be performed according to a procedure as follows. That is, the processing unit 21 transmits authentication information to the secure control unit 31 without transmitting an access request, and the secure control unit 31 authenticates the authentication information received from the processing unit 21.

Upon receiving non-permission information from the secure control unit 31 as a response to the authentication information, the processing unit 21 recognizes that the authentication has failed, and transmits rejection information to the management tool via the relay unit 53 and the external device port 54.

Meanwhile, upon receiving permission information from the secure control unit 31 as a response to the authentication information, the processing unit 21 recognizes that the authentication has succeeded, and requests a management program from the secure control unit 31.

In response to the request from the processing unit 21, the secure control unit 31 acquires the encoded management program from the secure storage unit 33, and decodes the management program according to a predetermined decoding method. Then, the secure control unit 31 outputs the decoded management program to the processing unit 21.

Upon receiving the management program from the secure control unit 31, the processing unit 21 uses the received management program.

More specifically, for example, the processing unit 21 holds the management program, and generates a process (hereinafter also referred to as "target process") which is an instance of the management program, on the basis of the held management program. The processing unit 21 may hold the management program in a RAM (Random Access Memory) which is not shown.

The processing unit 21 discards the management program, for example, when the vehicle 1 has started to move or when the use of the management program has ended.

More specifically, when using the management program, the processing unit 21 starts monitoring of the determination result obtained in the vehicle-state determination unit 22 and monitoring of the generated target process. Then, the processing unit 21 discards the management program on the basis of the monitoring result.

More specifically, the processing unit 21 outputs a determination command to the vehicle-state determination unit 22 at predetermined time intervals T1, for example, and receives determination result information from the vehicle-state determination unit 22 as a response to the determination command.

When the determination result information received from the vehicle-state determination unit 22 indicates that the vehicle 1 is not in the predetermined stop state, the processing unit 21 discards the held management program.

The processing unit 21 discards the held management program when the target process being monitored has disappeared. Instead of discarding the management program, the processing unit 21 may return the management program to the secure storage unit 33.

Meanwhile, the processing unit 21 continues to hold the management program when the determination result information indicates that the vehicle 1 is in the predetermined stop state and when the target process has not disappeared.

[Flow of Operation]

The gateway device includes a computer. An operation processing unit such as a CPU of the computer reads out a program including part or all of steps in a flowchart described below from a memory (not shown), and executes the program. The program for this device may be installed from the outside. The program for this device is distributed in a state of being stored in a storage medium.

Figure 3:
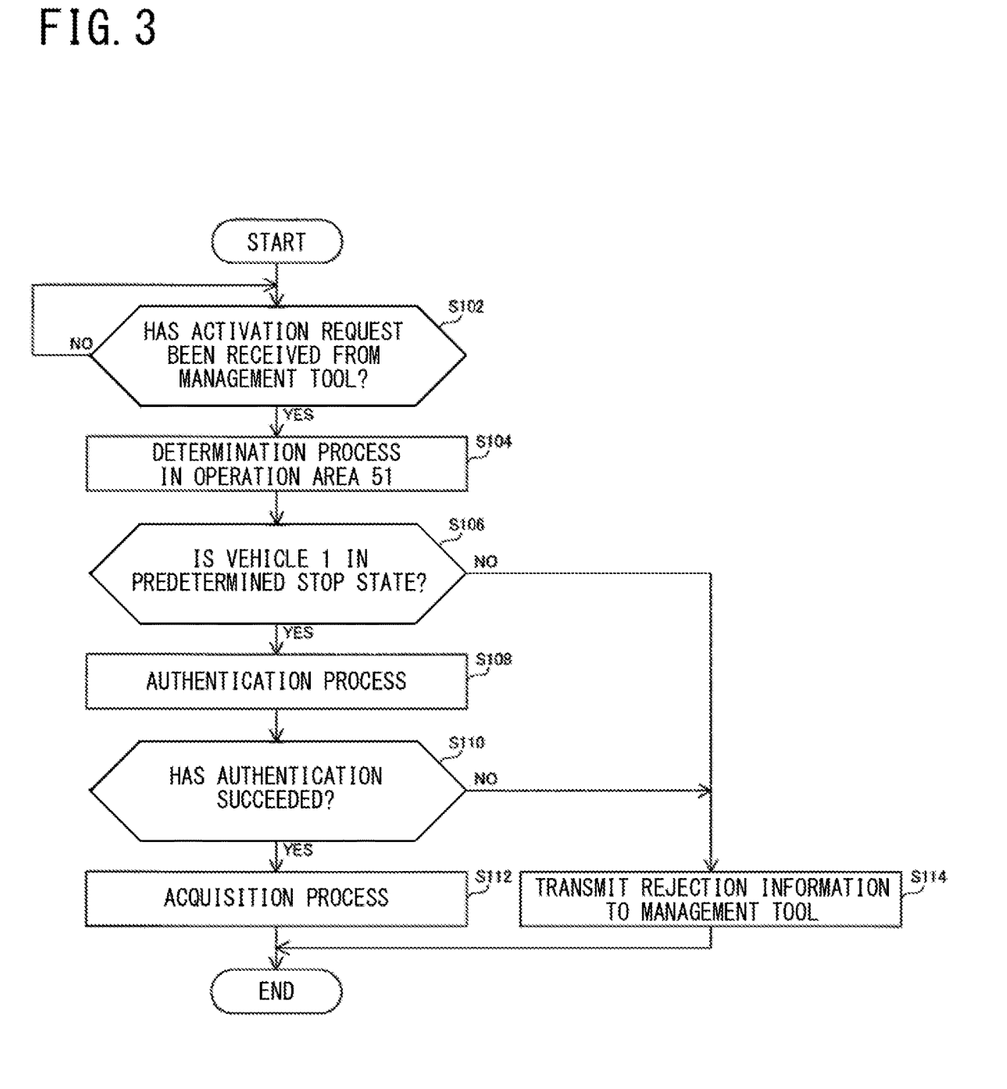
FIG. 3 is a flowchart showing an operation procedure performed when the gateway device in the on-vehicle communication system according to the embodiment of the present disclosure has received an activation request.

FIG. 3 is a flowchart showing an operation procedure performed when the gateway device in the on-vehicle communication system according to the embodiment of the present disclosure has received an activation request.

With reference to FIG. 3, firstly, the gateway device 101 performs a relay process of relaying messages and Ethernet frames until receiving an activation request from the management tool (NO in step S102).

Upon receiving an activation request from the management tool (YES in step S102), the gateway device 101 performs, in the operation area 51, a determination process of determining whether or not the vehicle 1 is in the predetermined stop state (step S104).

Next, when the vehicle 1 is in the predetermined stop state (YES in step S106), the gateway device 101 performs an authentication process of authenticating the management tool (step S108).

When the authentication of the management tool has succeeded (YES in step S110), the gateway device 101 performs an acquisition process (step S112).

When the vehicle 1 is not in the predetermined stop state (NO in step S106) and when the authentication of the management tool has failed (NO in step S110), the gateway device 101 transmits rejection information to the management tool (step S114).

Figure 4:
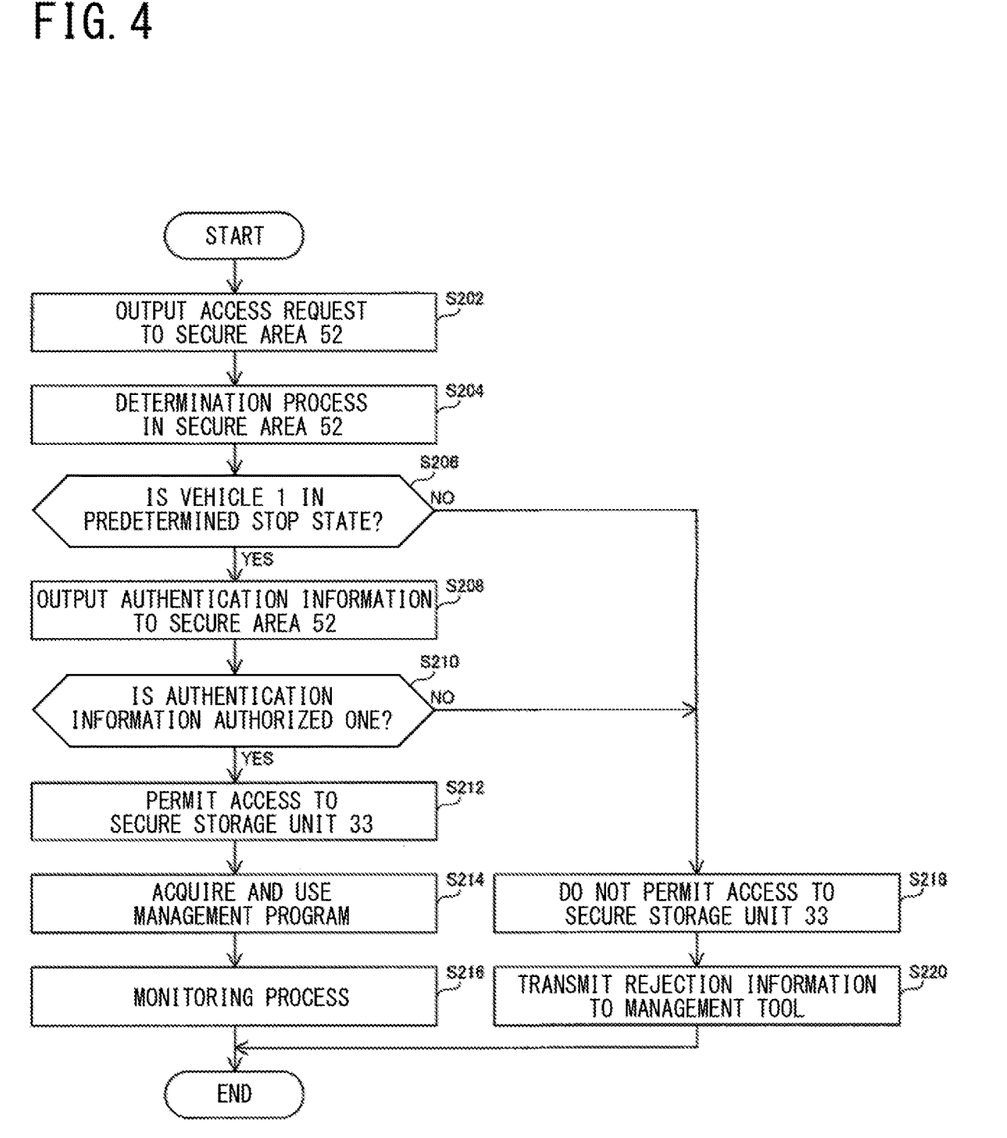
FIG. 4 is a flowchart showing an operation procedure performed when the gateway device in the on-vehicle communication system according to the embodiment of the present disclosure performs an acquisition process.

FIG. 4 is a flowchart showing an operation procedure performed when the gateway device in the on-vehicle communication system according to the embodiment of the present disclosure performs the acquisition process. FIG. 4 shows the details of the operation in step S112 in FIG. 3.

With reference to FIG. 4, firstly, the gateway device 101 outputs an access request to the secure area 52 (step S202).

Next, the gateway device 101 performs, in the secure area 52, a determination process of determining whether or not the vehicle 1 is in the predetermined stop state (step S204).

Next, when the vehicle 1 is in the predetermined stop state (YES in step S206), the gateway device 101 outputs authentication information to the secure area 52 (step S208).

Next, when the authentication information is an authorized one (YES in step S210), the gateway device 101 is permitted to access the secure storage unit 33 (step S212).

Next, the gateway device 101 acquires the management program from the secure storage unit 33, and holds and uses the acquired management program (step S214).

Next, the gateway device 101 performs a monitoring process of monitoring the state of the vehicle 1 and the usage status of the management program (step S216).

When the vehicle 1 is not in the predetermined stop state (NO in step S206) and when the authentication information is not authorized one (NO in step S210), the gateway device 101 is not permitted to access the secure storage unit 33 (step S218).

Next, the gateway device 101 transmits rejection information to the management tool (step S220).

Figure 5:
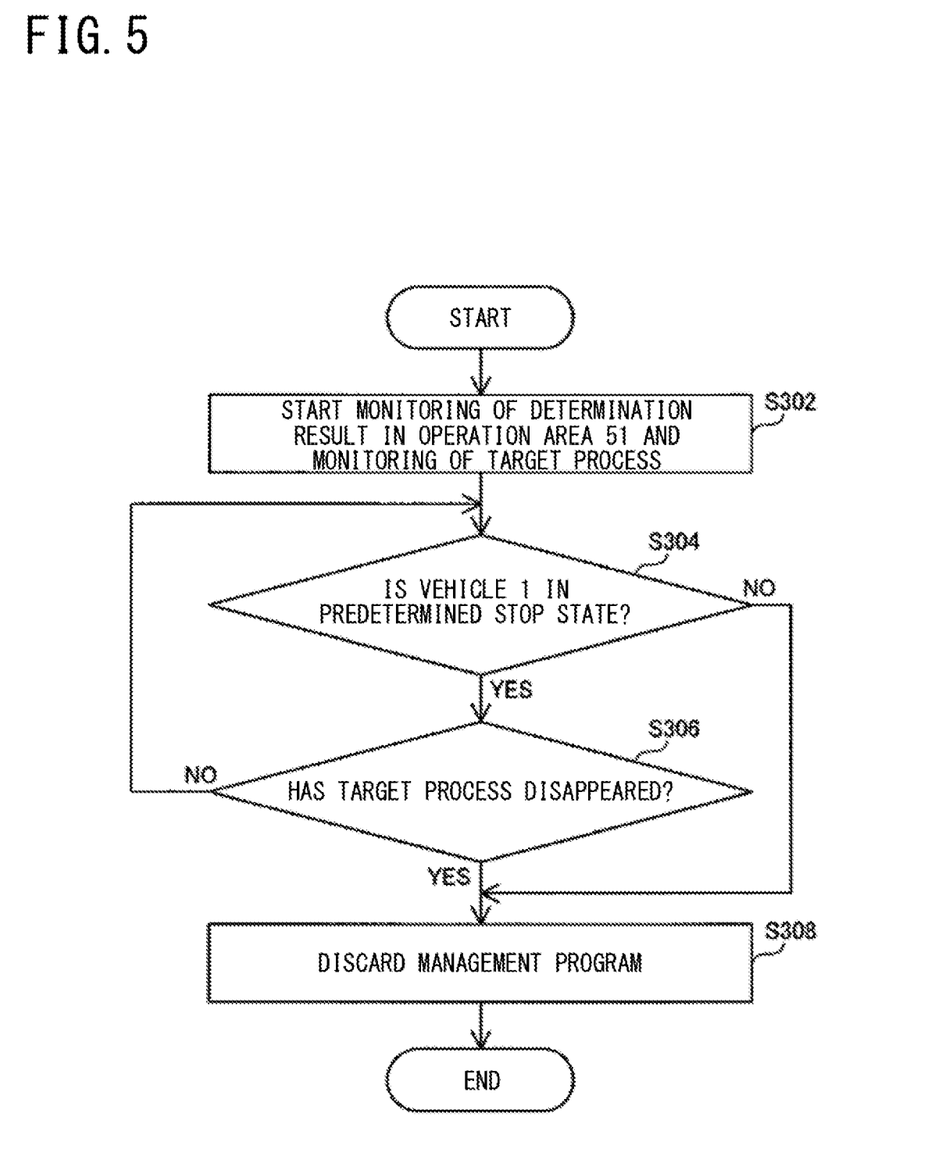
FIG. 5 is a flowchart showing an operation procedure performed when the gateway device in the on-vehicle communication system according to the embodiment of the present disclosure performs a monitoring process.

FIG. 5 is a flowchart showing an operation procedure performed when the gateway device in the on-vehicle communication system according to the embodiment of the present disclosure performs the monitoring process. FIG. 5 shows the details of the operation in step S216 in FIG. 4.

With reference to FIG. 5, firstly, the gateway device 101 starts monitoring of the result of the determination process in the operation area 51 and monitoring of the target process at predetermined intervals T1 (step S302).

Next, when the vehicle 1 is in the predetermined stop state and the target process has not disappeared (YES in step S304 and NO in step S306), the gateway device 101 continues to hold and use the management program.

Meanwhile, when the vehicle 1 is no longer in the predetermined stop state (NO in step S304) or when the target process has disappeared (YES in step S306), the gateway device 101 discards the held management program (step S308).

Although the gateway device 101 is configured to perform the above-described operation in the on-vehicle communication system according to the embodiment of the present disclosure, the present disclosure is not limited thereto. In the on-vehicle communication system 301, the function units may be configured to perform the above-described operation.

In the gateway device according to the embodiment of the present disclosure, the management tool is configured to be connected as an external device to the external device port 54. However, the present disclosure is not limited thereto. A smartphone, a navigation device, or the like may be connected as an external device to the external device port 54.

The gateway device according to the embodiment of the present disclosure is configured to include the vehicle-state determination unit in both the operation area 51 and the secure area 52. However, the present disclosure is not limited thereto. The gateway device 101 may be configured to include the vehicle-state determination unit in either one of the operation area 51 and the secure area 52. However, it is preferable to provide the vehicle-state determination unit in both the operation area 51 and the secure area 52. In this case, even if the operation area 51 has been hacked and authentication information has been stolen, the vehicle-state determination unit 32 provided in the secure area 52 can reject an unauthorized access from the operation area 51 during traveling of the vehicle 1.

Although the gateway device according to the embodiment of the present disclosure is configured to include the authentication unit 23, the present disclosure is not limited thereto. The gateway device 101 may be configured to include no authentication unit 23.

Although the parked state is adopted as the predetermined stop state in the gateway device according to the embodiment of the present disclosure, the present disclosure is not limited thereto. For example, the predetermined stop state may be a state in which the vehicle 1 is temporarily stopped with the shift range being in the drive position, and the parking brake or the foot brake being actuated.

In the gateway device according to the embodiment of the present disclosure, the vehicle-state determination units 22 and 32 are configured to determine whether or not the vehicle 1 is in the parked state by using the predetermined conditions C1 to C4. However, the present disclosure is not limited thereto. The vehicle-state determination units 22 and 32 may each be configured to determine whether or not the vehicle 1 is in the parked state by using other conditions.

In the gateway device according to the embodiment of the present disclosure, the vehicle-state determination units 22 and 32 are configured to determine that the vehicle 1 is in the predetermined stop state, when at least one of the predetermined conditions C1 to C4 is satisfied. However, the present disclosure is not limited thereto. The vehicle-state determination units 22 and 32 may be configured to determine that the vehicle 1 is in the predetermined stop state, when other conditions are satisfied.

In the gateway device according to the embodiment of the present disclosure, the processing unit 21 is configured to discard the management program when the vehicle 1 has started to move or when the use of the management program has ended. However, the present disclosure is not limited thereto. Not limited to the above configuration, the processing unit 21 may be configured to delete the management program after a predetermined time has passed from the timing to start the use of the management program.

In the gateway device according to the embodiment of the present disclosure, the processing unit 21 is configured to transmit rejection information to the management tool when the vehicle 1 is not in the predetermined stop state. However, the present disclosure is not limited thereto. The processing unit 21 may be configured to transmit no rejection information to the management tool even in the above case.

In the on-vehicle network system described in Patent Literature 1, when the vehicle including the on-vehicle network system is traveling, communication with devices outside the vehicle is cut off to avoid unauthorized access of the devices from outside the vehicle. However, in many cases, the relay device is more vulnerable in terms of security in its management function as compared to its relaying function. Specifically, for example, if the types of packets that are permitted to be relayed are illegally rewritten, unauthorized packets are also relayed and transmitted to the devices inside the vehicle, which makes the devices inside the vehicle vulnerable to attacks from the outside of the vehicle.

Meanwhile, the gateway device according to the embodiment of the present disclosure is mounted to the vehicle 1. The vehicle-state determination units 22 and 32 each determine whether or not the vehicle 1 is in the predetermined stop state. The secure area 52 is accessible from the processing unit 21 when the processing unit 21 outputs the predetermined information. The secure area 52 has, stored therein, the control information that allows the external device to control the gateway device 101. When the vehicle-state determination units 22 and 32 have made positive determinations, the processing unit 21 accesses the secure area 52 and performs the acquisition process of acquiring the control information from the secure area 52.

Thus, when the vehicle 1 is in the predetermined stop state, the control information is acquired from the secure area 52 which is difficult to be illegally accessed, whereby the use of the control information can be reliably restricted during traveling of the vehicle 1 in which the control information should not be used. Therefore, for example, it is possible to reduce the risk that the control information is abused during traveling of the vehicle 1 and the types of packets that are permitted to be relayed are illegally rewritten. Thus, it is possible to avoid the situation that the gateway device 101 is taken over and remotely controlled while the vehicle 1 is traveling. This provides satisfactory communication in the on-vehicle network.

In the gateway device according to the embodiment of the present disclosure, the authentication unit 23 performs the authentication process for an external device. Then, the processing unit 21 performs the acquisition process when the vehicle-state determination units 22 and 32 have made positive determinations and the authentication process has succeeded.

For example, when the external device is an unauthorized device, the authentication process for the external device is highly likely to fail. The above-described configuration can further reduce the risk of abuse of the control information by an unauthorized external device.

In the gateway device according to the embodiment of the present disclosure, the vehicle-state determination unit 32 is included in the secure area 52.

As described above, since the vehicle-state determination unit 32 is included in the secure area 52 which cannot be easily accessed, the vehicle-state determination unit 32 can be protected from hacking. Therefore, for example, it is possible to prevent the vehicle-state determination unit 32 from being illegally operated and being caused to perform a positive determination for the purpose of illegally acquiring the control information.

In the gateway device according to the embodiment of the present disclosure, the vehicle-state determination unit 32 is included in the secure area 52, and the vehicle-state determination unit 22 is included in an area, outside the secure area 52, such as the operation area 51. When both the vehicle-state determination unit 32 and the vehicle-state determination unit 22 have made positive determinations, the processing unit 21 accesses the secure area 52 and performs the acquisition process.

In the above configuration, for example, even when either one of the vehicle-state determination unit 32 and the vehicle-state determination unit 22 is illegally operated and forced to make a positive determination, the other determination unit that has not been subjected to the illegal operation can make a correct determination. Thus, illegal acquisition of the control information can be avoided with higher reliability.

In the gateway device according to the embodiment of the present disclosure, the predetermined stop state is the parked state.

Since the predetermined stop state is the parked state, even when the control information has been abused and the gateway device 101 has been taken over and remotely controlled, runaway of the vehicle 1 can be avoided because the vehicle 1 is in the parked state.

In the gateway device according to the embodiment of the present disclosure, the predetermined stop state is any of: the state in which the shift range is in the parking position; the state in which the shift range is in the neutral position and the parking brake or the foot brake is actuated; and the state in which the shift range is in the neutral position and the vehicle speed is zero.

In the above configuration, since the predetermined stop state is determined based on, for example, the information transmitted in the vehicle such as the CAN information, it is possible to easily determine whether or not the vehicle 1 is in the state where the use of the control information may be permitted.

In the gateway device according to the embodiment of the present disclosure, the processing unit 21 discards the control information when the vehicle 1 has started to move or when the use of the control information has ended.

In the above configuration, since the control information is discarded when the control information should not be used or when the control information is not used, the risk of abuse of the control information can be reduced.

In the gateway device according to the embodiment of the present disclosure, when the vehicle-state determination units 22 and 32 have made negative determinations, the processing unit 21 performs a response to reject an activation request, from an external device, which requests activation of a function to be implemented by the control information.

In the above configuration, the external device that has requested the use of the control information can be notified that the use of the control information is restricted in the vehicle 1.

It should be noted that the embodiments above are merely illustrative and not restrictive in all aspects. The scope of the present invention is defined by the scope of the claims, and is intended to include meaning equivalent to the scope of the claims and all modifications within the scope.

The above description includes the features in the additional note below.

[Additional Note 1]

An on-vehicle device mounted on a vehicle, comprising:
a processing unit;
a determination unit configured to determine whether or not the vehicle is in a predetermined stop state; and
a secure area that is accessible from the processing unit when the processing unit has output predetermined information, wherein
control information that allows an external device to control the on-vehicle device is stored in the secure area,
when the determination unit has made a positive determination, the processing unit accesses the secure area and performs an acquisition process of acquiring the control information from the secure area,
the on-vehicle device is a gateway device,
the on-vehicle device further includes a relay unit configured to relay data conforming to a communication standard of CAN (Controller Area Network), and data conforming to a communication standard of Ethernet,
the secure area has tamper resistance, and
the control information is a management program that causes the processing unit to implement a management function for providing the external device with a console for command operation, a management function for performing communication between the on-vehicle device and the external device, or a management function for performing filter setting in the relay unit.

REFERENCE SIGNS LIST 1 vehicle
10 Ethernet cable
11 CAN bus
21 processing unit
22 vehicle-state determination unit
23 authentication unit
31 secure control unit
32 vehicle-state determination unit
33 secure storage unit
51 operation area
52 secure area
53 relay unit
54 external device port
101 gateway device (on-vehicle device)
111, 161 function unit
301 on-vehicle communication system

The invention claimed is:

1. An on-vehicle device mounted on a vehicle, comprising:
a processing unit;
a determination unit configured to determine whether or not the vehicle is in a predetermined stop state; and
a secure area that is accessible from the processing unit when the processing unit has output predetermined information, wherein
the secure area has, stored therein, an encoded control program for causing the processing unit to implement a management function by communicating with an external device,
in response to the vehicle having been determined to be in the predetermined stop state by the determination unit, the processing unit accesses the secure area and performs an acquisition process of acquiring the encoded control program for causing the processing unit to implement the management function from the secure area,
the control program is a management program for causing the processing unit to implement the management function for (i) providing the external device with a console for command operation or (ii) providing the on-vehicle device with a filter setting for CAN communication or Ethernet communication, and
the processing unit discards the management program or returns the management program to the secure area when the vehicle has started to move or when use of the management program has ended.

2. The on-vehicle device according to claim 1, further comprising an authentication unit configured to perform an authentication process on the external device, wherein
the processing unit performs the acquisition process in response to the vehicle having been determined to be in the predetermined stop state by the determination unit and the authentication process having succeeded.

3. The on-vehicle device according to claim 1, wherein the determination unit is included in the secure area.

4. The on-vehicle device according to claim 1, wherein
the determination unit includes a first determination unit and a second determination unit,
the first determination unit is provided inside the secure area, and the second determination unit is provided outside the secure area, and
the processing unit accesses the secure area and performs the acquisition process in response to the vehicle having been determined to be in the predetermined stop state by both the first determination unit and the second determination unit.

5. The on-vehicle device according to claim 1, wherein the predetermined stop state is a parked state.

6. The on-vehicle device according to claim 1, wherein
in response to the vehicle having been determined to not be in the predetermined stop state by the determination unit, the processing unit performs a response to reject an activation request, from the external device, which requests activation of a function that is implemented by the control program.

7. A management method to be performed in an on-vehicle device that is mounted on a vehicle, and that includes a processing unit, and a secure area accessible from the processing unit when the processing unit has output predetermined information,
the secure area having, stored therein, an encoded control program for causing the processing unit to implement a management function by communicating with an external device,
the method comprising:
determining whether or not the vehicle is in a predetermined stop state; and
in response to a result of the determination being that the vehicle is in the predetermined stop state, causing the processing unit to access the secure area, and perform an acquisition process of acquiring the encoded control program for causing the processing unit to implement the management function from the secure area, wherein
the control program is a management program for causing the processing unit to implement the management function for (i) providing the external device with a console for command operation or (ii) providing the on-vehicle device with a filter setting for CAN communication or Ethernet communication, and
the processing unit discards the management program or returns the management program to the secure area when the vehicle has started to move or when use of the management program has ended.

8. A non-transitory computer readable storage medium storing a management program to be used in an on-vehicle device mounted on a vehicle, the program causing a computer to function as a processing unit, and a determination unit configured to determine whether or not the vehicle is in a predetermined stop state, wherein
- the on-vehicle device includes a secure area that is accessible from the processing unit when the processing unit has output predetermined information,
- the secure area has, stored therein, an encoded control program for causing the processing unit to implement a management function by communicating with an external device,
- in response to the vehicle having been determined to be in the predetermined stop state by the determination unit, the processing unit accesses the secure area and performs an acquisition process of acquiring the encoded control program for causing the processing unit to implement the management function from the secure area,
- the control program is a management program for causing the processing unit to implement the management function for (i) providing the external device with a console for command operation or (ii) providing the on-vehicle device with a filter setting for CAN communication or Ethernet communication, and
- the processing unit discards the management program or returns the management program to the secure area when the vehicle has started to move or when use of the management program has ended.

* * * * *